United States Patent
Suzuki

(10) Patent No.: US 10,769,815 B2
(45) Date of Patent: Sep. 8, 2020

(54) IMAGE PROCESSING DEVICE AND IMAGE PROCESSING METHOD

(71) Applicant: ISUZU MOTORS LIMITED, Shinagawa-ku, Tokyo (JP)

(72) Inventor: Teruhiko Suzuki, Ayase (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/318,932

(22) PCT Filed: Jul. 20, 2017

(86) PCT No.: PCT/JP2017/026327
§ 371 (c)(1),
(2) Date: Jan. 18, 2019

(87) PCT Pub. No.: WO2018/016599
PCT Pub. Date: Jan. 25, 2018

(65) Prior Publication Data
US 2019/0259179 A1    Aug. 22, 2019

(30) Foreign Application Priority Data
Jul. 21, 2016 (JP) ................. 2016-143002

(51) Int. Cl.
G06T 7/80 (2017.01)
G06K 9/00 (2006.01)
B60W 40/11 (2012.01)

(52) U.S. Cl.
CPC ............. *G06T 7/80* (2017.01); *B60W 40/11* (2013.01); *G06K 9/00791* (2013.01); *G06T 2207/10016* (2013.01); *G06T 2207/30256* (2013.01)

(58) Field of Classification Search
CPC ...... G06K 9/00791; G06T 2207/10016; G06T 2207/30256; G06T 7/80; B60W 40/11
See application file for complete search history.

(56) References Cited

FOREIGN PATENT DOCUMENTS

| CN | 101776438 A | 7/2010 |
|----|-------------|--------|
| EP | 2881710 A1 | 6/2015 |
| JP | H11-211492 A | 8/1999 |
| JP | 2007-334450 A | 12/2007 |

(Continued)

OTHER PUBLICATIONS

Labayrade et al., "Advanced Lane Detection for Autonomous Navigation", Jan. 1, 2008, Autonomous Robots Research ADVA, Nova Science Publishers, Inc., XP008175610, ISBN: 978-1-60456-185-2 (Year: 2008).*

(Continued)

*Primary Examiner* — Sath V Perungavoor
*Assistant Examiner* — Tyler B Edwards
(74) *Attorney, Agent, or Firm* — Procopio, Cory, Hargreaves & Savitch LLP

(57) ABSTRACT

The image processing device includes a scale correction unit. In a case where a difference between a width of a lane calculated by a lane-width calculation unit and a width of the lane acquired from map data is greater than a predetermined value that serves as a criterion for correcting errors, the scale correction unit corrects a correlation between a length of a subject in a captured image and the number of pixels constituting the captured image.

5 Claims, 4 Drawing Sheets

(56) References Cited

FOREIGN PATENT DOCUMENTS

JP 2013-097714 A 5/2013
JP 2015-189353 A 11/2015

OTHER PUBLICATIONS

Extended European Search Report for related EP App No. 17831115.5 dated Jun. 19, 2019, 11 pages.
Labayrade et al., Advanced-Lane Detection for Autonomous Navigation, Jan. 1, 2008, France, Autonomous Robots Research Advances, Nova Science Publishers, Inc., 38 pages.
Ernst et al., Camera Calibration for Lane and Obstacle Detection, Robert Bosch GmbH, Proceedings 1999 IEEE/IEEJ/JSAI International Conference on Intelligent Transportation Systems, Tokyo, Japan, Oct. 5-8, 1999, 6 pages.
International Search Report and Written Opinion for related International Application No. PCT/JP2017/026327 dated Oct. 17, 2017; English translation of ISR provided; 6 pages.

* cited by examiner

IMAGE PROCESSING DEVICE AND IMAGE PROCESSING METHOD

CROSS-REFERENCE TO RELATED APPLICATIONS

This application is a U.S. National Stage entry of PCT Application No: PCT/JP2017/026327 filed on Jul. 20, 2017, which claims priority to Japanese Patent Application No. 2016-143002 filed on Jul. 21, 2016, the contents of which are incorporated herein by reference.

TECHNICAL FIELD

The present disclosure relates to an image processing device that corrects a deviation of a detected width of a lane, and an image processing method.

BACKGROUND ART

A vehicle is controlled by using road information on a traveling road ahead obtained from an imaging device. Patent Literature 1 discloses a technique through which final road information is obtained based on a first road information obtained based on map information and a second road information obtained by using an imaging device.

CITATION LIST

Patent Literature

Patent Literature 1: JP-A-H11-211492

SUMMARY

Technical Problem

In a case where attempting to obtain road information in front of a vehicle using a camera or the like, orientation, height, or the like of the camera may deviate from initial setting due to vibration of the vehicle or the like, resulting in failure in acquiring correct road information. Therefore, there is a problem that driving assistance such as lane maintaining assistance using road information cannot be effectively used.

The present disclosure provides a technique through which accuracy of road information acquired using a camera or the like is improved.

Solution to Problem

According to a first aspect of the present disclosure, an image processing device includes: a lane-width calculation unit, which calculates a width of a lane in which a vehicle travels from a captured image, in which a front of the vehicle in a traveling direction is captured, based on a correlation between a length of a subject in the captured image and a number of pixels constituting the captured image; a position information acquisition unit, which acquires information indicating a position of the vehicle; a lane-width acquisition unit, which acquires information indicating a width of the lane in which the vehicle travels based on the information indicating the position of the vehicle; and a scale correction unit, which corrects the correlation between the length of the subject in the captured image and the number of pixels constituting the captured image in a case where a difference between the width of the lane calculated by the lane-width calculation unit and the width of the lane acquired from the map data is greater than a predetermined value that serves as a criterion for correcting errors.

The scale correction unit may correct the correlation between the length of the subject in the captured image and the number of pixels constituting the captured image in a case where the difference between the width of the lane calculated by the lane-width calculation unit and the width of the lane acquired by the lane-width acquisition unit is greater than the predetermined value for a period longer than a predetermined period.

The predetermined value may be determined based on the width of the lane acquired by the lane-width acquisition unit and a width of the vehicle.

The predetermined value may be determined to be small as a difference between the width of the lane acquired by the lane-width acquisition unit and the width of the vehicle becomes small.

According to a second aspect of the present disclosure, an image processing method includes: calculating a width of a lane in which a vehicle travels from a captured image, in which captures a front of the vehicle in a traveling direction, based on a correlation between a length of a subject in the captured image and a number of pixels constituting the captured image; acquiring information indicating a position of the vehicle; acquiring information indicating a width of the lane in which the vehicle travels based on the information indicating the position of the vehicle; and correcting the correlation between the length of the subject in the captured image and the number of pixels constituting the captured image in a case where a difference between the calculated width of the lane and the width of the lane acquired from the map data is greater than a predetermined value that serves as a criterion for correcting errors.

Advantageous Effects of Invention

According to the present disclosure, the accuracy of road information acquired by using a camera or the like can be improved.

DESCRIPTION OF EMBODIMENTS

[Overview of Image Processing Device]

An image processing device according to an embodiment is described below with reference to FIG. 1.

Figure 1A:
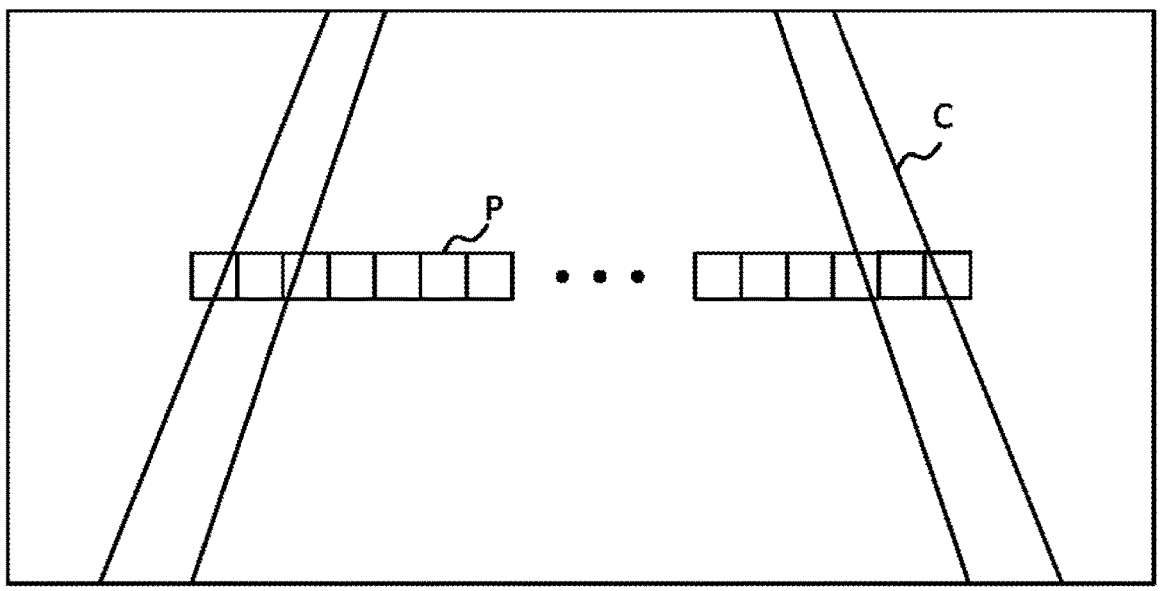
FIGS. 1A and 1B are diagrams showing captured images in front of a vehicle in a traveling direction.
Figure 1B:
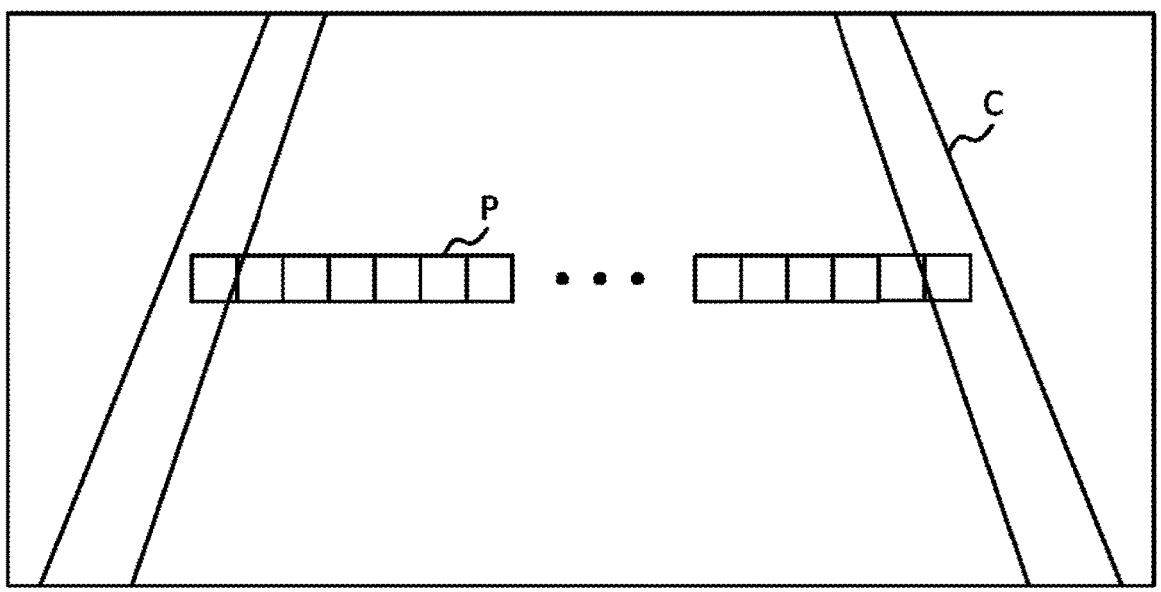

FIGS. 1A and 1B are diagrams showing captured images in front of a vehicle in a traveling direction. FIGS. 1A and 1B depict pixels P and a traveling lane divided by dividing lines C. In FIGS. 1A and 1B, areas to be captured are different. A camera that captures the captured image of FIG. 1B is downwardly oriented than the camera that captures the captured image of FIG. 1A due to an influence of vibration or the like. Therefore, the captured image of FIG. 1A captures a farther side than the captured image of FIG. 1B.

The image processing device calculates, for example, a size or length of a subject based on the number of pixels occupied by the subject in the captured image. As is seen from FIGS. 1A and 1B, the number of pixels corresponding to a lane width changes in a case where orientation of the camera is changed due to vibration or the like. As a result, the image processing device cannot calculate the correct lane width. In a case where the image processing device cannot calculate the correct lane width, for example, calculation accuracy of a curvature of a curve in which the vehicle travels is lowered, and the image processing device cannot effectively perform steering assistance during curve travel.

In a case where a difference between a width of a lane calculated from the captured image and a width of the lane acquired from map data is greater than a predetermined value that serves as a criterion for correcting errors, the image processing device according to the embodiment corrects a correlation between the length of the subject in the captured image and the number of pixels constituting the captured image. This makes it possible to improve accuracy of road information acquired by the vehicle using a camera or the like. A method of detecting a width of the lane is not limited to use of the camera as long as the width of the lane can be detected. The image processing device according to the embodiment is described below with reference to FIG. 2.

[Configuration Diagram of Image Processing Device]

Figure 2:
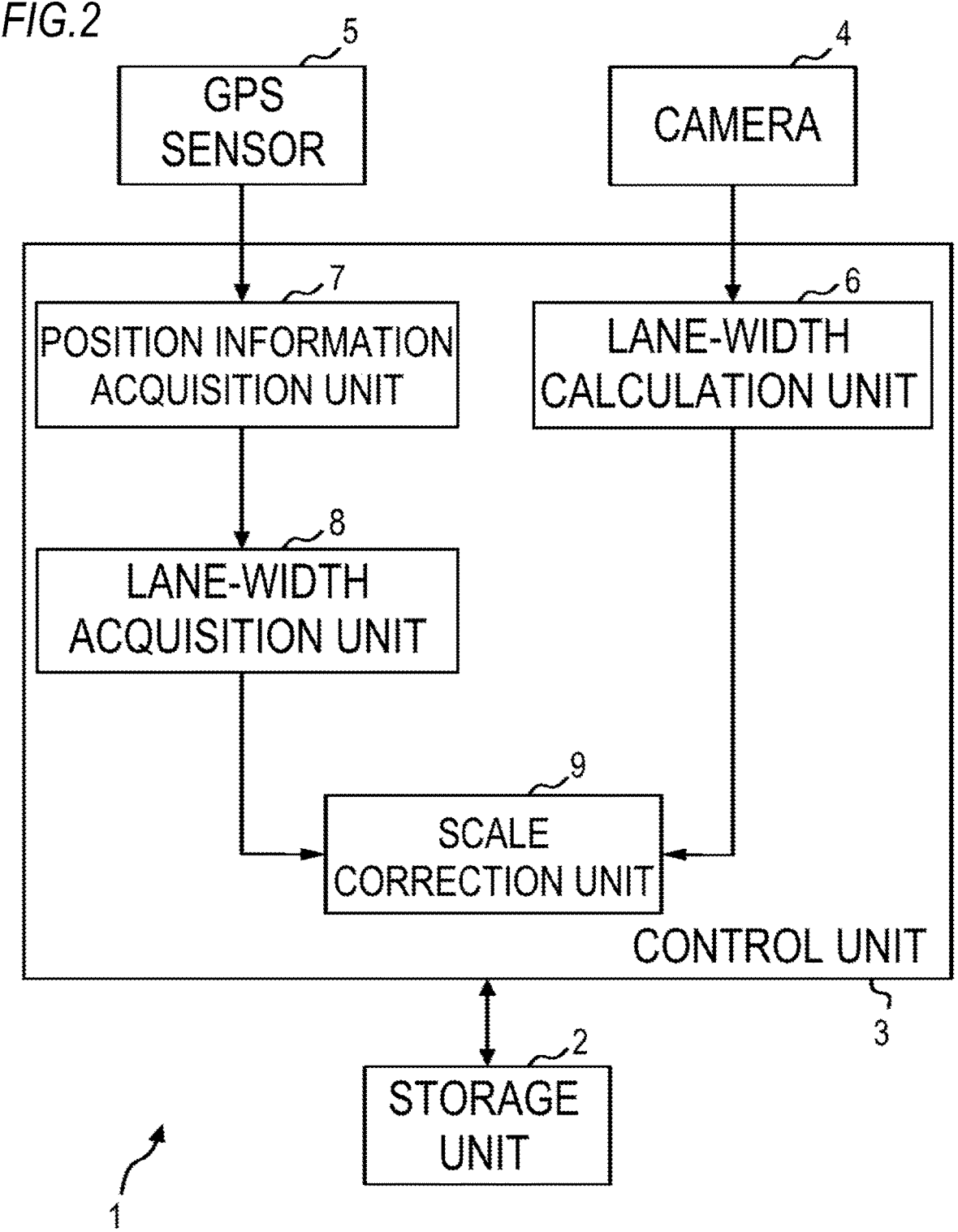
FIG. 2 is a diagram showing a configuration of an image processing device according to an embodiment.

FIG. 2 is a diagram showing a configuration of an image processing device 1 according to the embodiment. The image processing device 1 includes a storage unit 2, a control unit 3, a camera 4, and a global positioning system (GPS) sensor 5. The control unit 3 is, for example, an electronic control unit (ECU), and is connected to the storage unit 2 and the camera 4 in a wired or wireless manner. The camera 4 captures a road in front of the vehicle in the traveling direction. The GPS sensor 5 acquires position information on the vehicle.

The storage unit 2 includes, for example, a Read Only Memory (ROM) in which a program executed by the control unit 3 is recorded and a Random Access Memory (RAM) that temporarily stores data. The ROM records map data including information on a width of a lane of a road on which the vehicle travels. The ROM also records magnitude of an error that serves as a criterion for correcting the correlation between the length of the subject in the captured image and the number of pixels constituting the captured image. The RAM records the corrected correlation between the length of the subject in the captured image and the number of pixels constituting the captured image. The RAM also records captured images captured by the camera 4.

The storage unit 2 further may include a solid state drive (SSD), a hard disk drive (HDD), or the like, and the map data may be recorded in the SSD or the HDD. In this case, the width of the lane can be calculated on a corrected scale even after an engine is stopped by recording the correlation between the length of the subject in the captured image and the number of pixels constituting the captured image in the same SSD or HDD after error correction.

The control unit 3 functions as a lane-width calculation unit 6, a position information acquisition unit 7, a lane-width acquisition unit 8, and a scale correction unit 9 by executing the program stored in the storage unit 2.

The lane-width calculation unit 6 acquires a captured image, in which a front of the vehicle in the traveling direction is captured, from the camera 4 and calculates a width of a lane in which the vehicle travels from the captured image. Specifically, for example, the lane-width calculation unit 6 counts the number of pixels present from a pixel on a dividing line to a pixel on another dividing line, as shown in FIG. 1, and calculates the width of the lane based on a correlation between a predetermined number of pixels and a distance.

For example, in a case where a length of 1 cm per pixel is determined, the lane-width calculation unit 6 calculates the width of the lane as 3 m if there are 300 pixels between dividing lines in the captured image. The lane-width calculation unit 6 records the calculated width of the lane in the storage unit 2, and notifies the scale correction unit 9 of the width. The width of the lane may be arbitrarily defined. The lane-width calculation unit 6 may measure the lane width from outside of a dividing line having a thickness. The lane-width calculation unit 6 may measure the lane width from middle of a dividing line. The lane-width calculation unit 6 may measure the lane width from inside of a dividing line. A dividing line is detected, for example, based on a known method.

The position information acquisition unit 7 acquires information indicating a position of the vehicle from the GPS sensor 5. After acquiring the information on the position of the vehicle, the position information acquisition unit 7 notifies the lane-width acquisition unit 8 of the acquired information.

Based on the information indicating the position of the vehicle notified from the position information acquisition unit 7, the lane-width acquisition unit 8 acquires a width of the lane in which the vehicle travels from the map data recorded in the storage unit 2. The lane-width acquisition unit 8 records the width of the lane acquired from the map data in the storage unit 2 and notifies the scale correction unit 9 of the width.

In a case where an absolute value of a difference between the width of the lane calculated by the lane-width calculation unit 6 and the width of the lane acquired from the map data is greater than a predetermined value that serves as a criterion for correcting errors, the scale correction unit 9 corrects a correlation between the length of the subject in the captured image and the number of pixels constituting the captured image. The predetermined value is, for example, the same as the thickness of the dividing line or 10 cm.

For example, it is recorded that the number of pixels present between dividing lines in FIG. 1B is 250, which corresponds to 1 cm per pixel. The lane-width calculation unit 6 calculates the width of the lane as 2.5 m. Meanwhile, in a case where the width of the lane acquired by the lane-width acquisition unit 8 from the map data is 3 m, an error between the width of the lane calculated by the lane-width calculation unit 6 and the width of the lane acquired by the position information acquisition unit 7 is 50 cm.

In a case where the error 50 cm is greater than the predetermined value, the scale correction unit 9 corrects the correlation between the length of the subject in the captured image and the number of pixels constituting the captured image. In this case, the scale correction unit 9 corrects the correlation between the length of the subject in the captured image and the number of pixels constituting the captured image assuming, for example, 1.2 cm per pixel, and records the correlation in the storage unit 2.

The predetermined value may be determined based on the width of the lane acquired by the lane-width acquisition unit 8 and a vehicle width. For example, the predetermined value may be small as a difference between the width of the lane acquired by the lane-width acquisition unit 8 and the vehicle width becomes small.

For example, the vehicle is likely to get out of the lane in a case where the difference between the width of the lane and the vehicle width is small. Therefore, in a case where the difference between the width of the lane and the vehicle width is small, the correlation between the length of the subject in the captured image and the number of pixels constituting the captured image is corrected even if the difference between the width of the lane calculated by the lane-width calculation unit 6 and the width of the lane acquired by the lane-width acquisition unit 8 from the map data is small. Accordingly, the image processing device 1 can detect the width of the lane with high accuracy and perform lane maintaining assistance more effectively.

Further, the predetermined value may be increased as the difference between the width of the lane acquired by the lane-width acquisition unit 8 and the vehicle width becomes large. In this case, the correlation between the length of the subject in the captured image and the number of pixels constituting the captured image is not corrected in a case where the difference between the width of the lane calculated by the lane-width calculation unit 6 and the width of the lane acquired by the lane-width acquisition unit 8 from the map data is small. Accordingly, chances that the scale correction unit 9 corrects the correlation between the length of the subject in the captured image and the number of pixels constituting the captured image are reduced. As a result, driving experience is improved since a driver enjoys the lane maintaining assistance that performs the same operation over a long period.

The predetermined value may also be changed according to the thickness of the dividing line detected from the captured image. For example, the predetermined value may be small as the dividing line is thin. In a case where the dividing line is thin, chances that the vehicle gets over the dividing line, that is, gets over the lane, increases. Therefore, in a case where the dividing line is thin, the image processing device 1 can effectively perform the lane maintaining assistance by correcting the correlation between the length of the subject in the captured image and the number of pixels constituting the captured image even in a case where the error is small.

In a case where the difference between the width of the lane calculated by the lane-width calculation unit 6 and the width of the lane acquired by the lane-width acquisition unit 8 is greater than the predetermined value for a period longer than a predetermined period, the scale correction unit 9 may correct the correlation between the length of the subject in the captured image and the number of pixels constituting the captured image. This is described with reference to FIG. 3.

Figure 3:
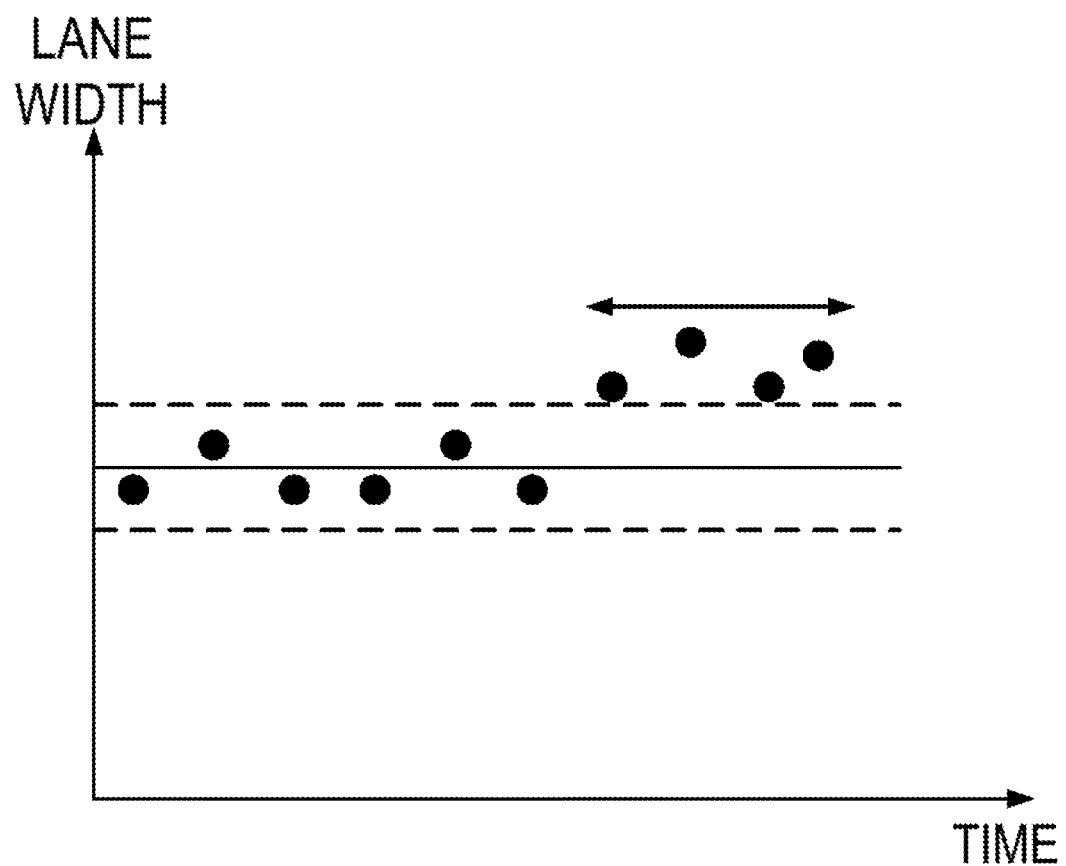
FIG. 3 is a diagram in which widths of a lane calculated by a lane-width calculation unit at each time point are plotted.

FIG. 3 is a diagram in which widths of a lane calculated by the lane-width calculation unit 6 at each time point are plotted. In a coordinate system in FIG. 3, a vertical axis indicates a width of the lane, and a horizontal axis indicates time. The width of the lane acquired by the lane-width acquisition unit 8 from the map data is represented by a solid line, and the predetermined value indicating an allowable error is represented by a width of the solid line and broken lines in FIG. 3.

As shown in FIG. 3, in a case where the width of the lane calculated by the lane-width calculation unit 6 deviates from between the broken lines from a certain time on and such a situation continues for a predetermined period, the scale correction unit 9 corrects the correlation between the length of the subject in the captured image and the number of pixels constituting the captured image. The predetermined period is longer than a period considered for the vehicle to pass through a distorted place of the traveling road, for example, 5 seconds.

In this case, the scale correction unit 9 does not correct the correlation between the length of the subject in the captured image and the number of pixels constituting the captured image, for example, in a case where the vehicle temporarily passes through a place where the road has deteriorated and the diving line deviates from an initially laid position. Therefore, it is possible to prevent the correlation between the length of the subject in the captured image and the number of pixels constituting the captured image from being erroneously corrected even if a position of a camera for capturing the captured image is not deviated.

[Processing Flow of Image Processing Device 1]

Figure 4:
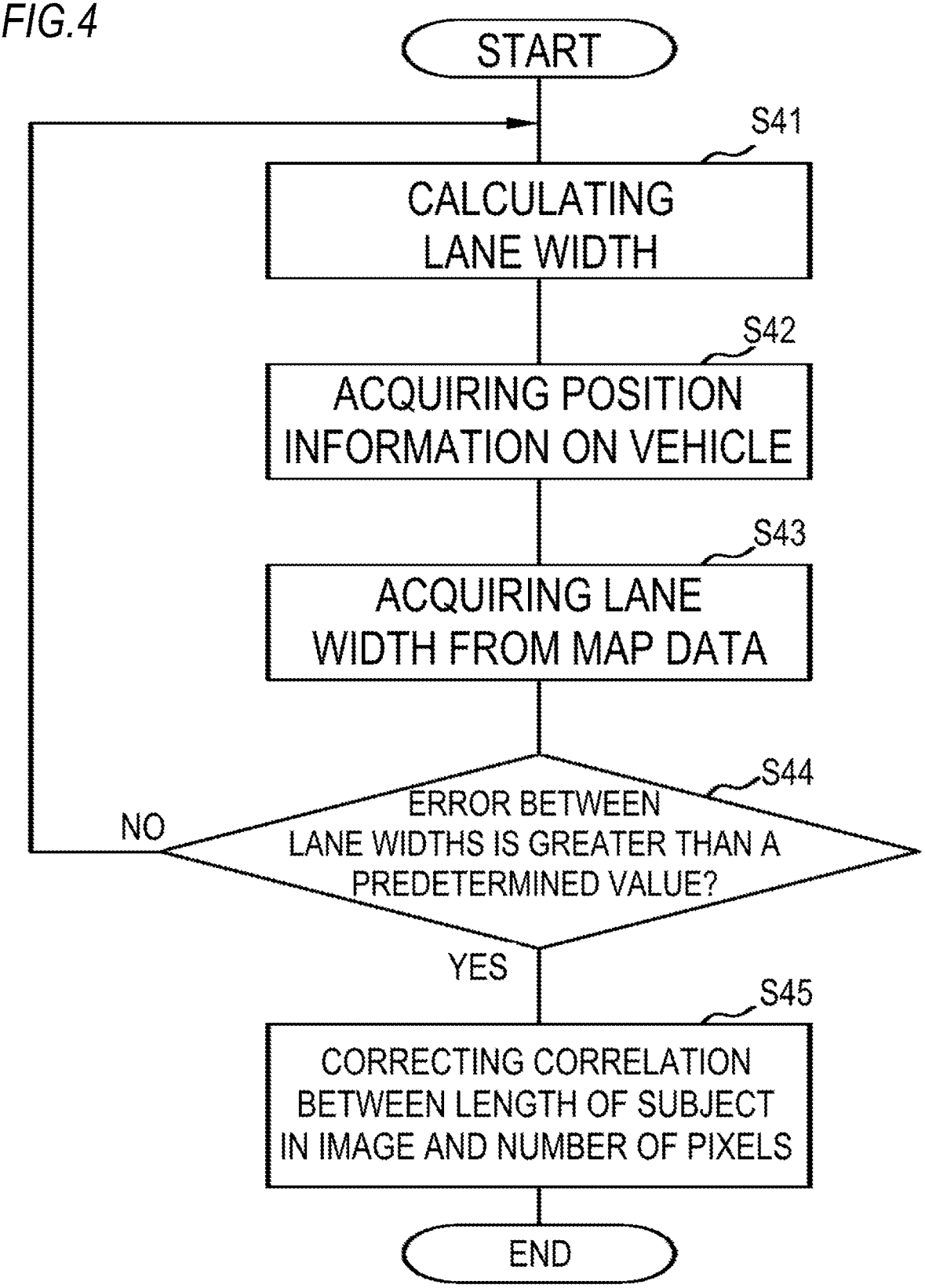
FIG. 4 is a flowchart showing a processing flow of the image processing device.

FIG. 4 is a flowchart showing a processing flow of the image processing device 1. The flowchart begins with the lane-width calculation unit 6 calculating the width of the lane based on the captured image (S41). Subsequently, the position information acquisition unit 7 acquires the position information on the vehicle (S42). Subsequently, the lane-width acquisition unit 8 acquires the width of the lane from the map data based on the position information on the vehicle (S43).

In a case where an error between the width of the lane acquired from the map data and the width of the lane calculated by the lane-width calculation unit 6 is not greater than the predetermined value (NO in S44), the image processing device 1 starts the process again from S41. In a case where the error between the width of the lane acquired from the map data and the width of the lane calculated by the lane-width calculation unit 6 is greater than the predetermined value (YES in S44), the scale correction unit 9 corrects the correlation between the length of the subject in the captured image and the number of pixels constituting the captured image.

[Effects of Image Processing Device 1]

In a case where the difference between the width of the lane calculated by the lane-width calculation unit 6 and the width of the lane acquired from the map data is greater than the predetermined value that serves as a criterion for correcting errors, the image processing device 1 corrects the correlation between the length of the subject in the captured image and the number of pixels constituting the captured image.

Accordingly, the image processing device 1 can improve accuracy of road information including the width and the curvature of the lane which is calculated based on the captured image or the like captured by the camera. As a result, the image processing device 1 can improve performance of the lane maintaining assistance of the vehicle.

Although the present disclosure has been described with reference to the embodiment, the technical scope of the present disclosure is not limited to the above embodiment. It is apparent to persons skilled in the art that various modifications or improvements can be added to the above embodiment. It is also apparent from description of the scope of the claims that an embodiment with such modifications or improvements can be included in the technical scope of the present disclosure.

The present application is based on Japanese Patent Application No. 2016-143002 filed on Jul. 21, 2016, contents of which are incorporated herein as reference.

INDUSTRIAL APPLICABILITY

The present invention can improve accuracy of road information acquired by using a camera or the like.

DESCRIPTION OF REFERENCE NUMERALS

C: dividing line
P: pixel
1: image processing device
2: storage unit
3: control unit
4: camera
5: GPS sensor
6: lane-width calculation unit
7: position information acquisition unit
8: lane-width acquisition unit
9: scale correction unit

The invention claimed is:

1. An image processing device comprising:
a storage unit configured to store executable instructions; and
an electronic control unit (ECU) communicatively coupled to the storage unit, the ECU configured to execute the executable instructions to:
calculate a width of a lane in which a vehicle travels from a captured image, in which a front of the vehicle in a traveling direction is captured, based on a correlation between a length of a subject in the captured image and a number of pixels constituting the captured image;
acquire information indicating a position of the vehicle;
acquire information indicating a width of the lane in which the vehicle travels, from map data, based on the information indicating the position of the vehicle; and
correct the correlation between the length of the subject in the captured image and the number of pixels constituting the captured image in a case where a difference between the width of the lane calculated from thee captured image and the width of the lane acquired from the map data is greater than a predetermined value that serves as a criterion for correcting errors.

2. The image processing device according to claim 1, wherein the ECU is further configured to correct the correlation between the length of the subject in the captured image and the number of pixels constituting the captured image in a case where the difference between the width of the lane calculated from thee captured image and the width of the lane acquired the map data is greater than the predetermined value for a period longer than a predetermined period.

3. The image processing device according to claim 1, wherein the predetermined value is determined based on the width of the lane acquired from the map data and a width of the vehicle.

4. The image processing device according to claim 3, wherein the predetermined value is decreased as a difference between the width of the lane acquired from the map data and the width of the vehicle is decreased.

5. An image processing method comprising:
calculating a width of a lane in which a vehicle travels from a captured image, in which a front of the vehicle in a traveling direction is captured, based on a correlation between a length of a subject in the captured image and a number of pixels constituting the captured image;
acquiring information indicating a position of the vehicle;
acquiring information indicating a width of the lane in which the vehicle travels, from map data, based on the information indicating the position of the vehicle; and
correcting the correlation between the length of the subject in the captured image and the number of pixels constituting the captured image in a case where a difference between the calculated width of the lane and the width of the lane acquired from the map data is greater than a predetermined value that serves as a criterion for correcting errors.

* * * * *